United States Patent [19]

Takahashi et al.

[11] Patent Number: 5,361,616
[45] Date of Patent: Nov. 8, 1994

[54] COATING COMPOSITION AND PROCESS FOR PRODUCING A PRECOATED PLATE

[75] Inventors: Toshiya Takahashi, Kuroiso; Norio Uriya, Yokohama; Yoshihisa Nagashima, Tochigi, all of Japan

[73] Assignee: Dai Nippon Toryo Co., Ltd., Osaka, Japan

[21] Appl. No.: 895,677

[22] Filed: Jun. 9, 1992

[51] Int. Cl.$^5$ .................. B21D 5/00; G03F 7/027; B05D 3/02
[52] U.S. Cl. ................... 72/46; 430/320; 430/284; 430/920; 522/6; 522/904; 522/117; 522/116; 522/126; 522/167; 522/96; 427/409; 427/493; 427/508; 427/520; 544/196
[58] Field of Search ............ 430/920, 284, 320; 522/6, 904, 117, 116, 126, 167, 96; 427/409, 493, 508, 520; 544/196; 72/46

[56] References Cited

U.S. PATENT DOCUMENTS

| | | | |
|---|---|---|---|
| 3,899,611 | 8/1975 | Hall . | |
| 4,266,053 | 5/1981 | Imanaka et al. | 544/196 |
| 4,540,649 | 9/1985 | Sakurai | 522/117 |
| 5,153,102 | 10/1992 | Lee et al. | 430/284 |

FOREIGN PATENT DOCUMENTS

| | | |
|---|---|---|
| 0254924 | 2/1988 | European Pat. Off. . |
| 0464466 | 1/1992 | European Pat. Off. . |
| 560729 | 4/1975 | Switzerland . |

*Primary Examiner*—Charles L. Bowers, Jr.
*Assistant Examiner*—Mark F. Huff
*Attorney, Agent, or Firm*—Oblon, Spivak, McClelland, Maier & Neustadt

[57] ABSTRACT

A coating composition having photopolymerizability and heat curability, which comprises, as main components, (A) a vinyl copolymer having polymerizable double bonds and crosslinkable hydroxyl groups,
(B) a condensation polymerizable compound of the following formula (i) or a condensation polymer thereof, and
(C) a photopolymerization initiator:

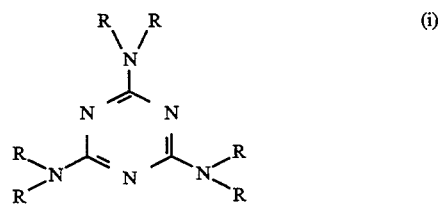

(i)

wherein each of the plurality of R which may be the same or different, is —H, —CH$_2$OH, —CH$_2$OCH$_3$, —CH$_2$OC$_4$H$_9$,

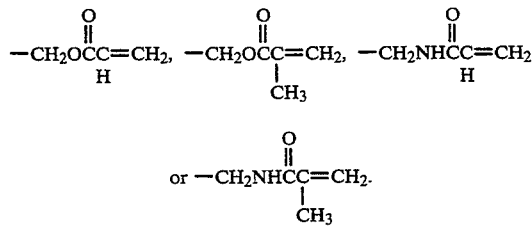

4 Claims, No Drawings

COATING COMPOSITION AND PROCESS FOR PRODUCING A PRECOATED PLATE

TITLE OF THE INVENTION

BACKGROUND OF THE INVENTION

Field of the Invention

The present invention relates to a coating composition for a coating film having high hardness and high flexibility. More particularly, it relates to a coating composition having both ultraviolet curability and heat curability. The present invention relates also to a process for producing a precoated plate having such a coating composition coated thereon.

DESCRIPTION OF THE BACKGROUND

Heretofore, as a field where a coating film having a proper flexibility and hardness is required, there was a field of precoated plates, particularly a field of precoated metals where the base material is a metal. Such precoated metals were generally classified into those for exterior use such as roof materials or outer wall siding materials and those for interior use such as home electric appliances, kitchen utensils, office machines and appliances or interior walls.

The properties required for such precoated metals are various. For example, precoated metals for exterior use are required to have e.g. weather resistance, corrosion resistance and flexibility. On the other hand, precoated metals for interior use are required to have stain resistance, chemical resistance and flexibility, and recently, a high quality coating film is required also from the viewpoint of the hardness, heat resistance and glossiness. However, when after coating, the coated plate is to be deformed to a large extent for shaping, it is difficult to attain a balance of the physical properties of the coating film. Namely, a high level of flexibility and the hardness and stain resistance of the coating film are parameters which usually oppose each other.

On the other hand, there have heretofore been known a coating composition curable by electron beams and heat comprising a polyester resin and a compound having a group reactive with active hydrogen (Japanese Unexamined Patent Publication No. 102279/1990) and a method wherein a composition comprising a polyester resin, a curing agent thereof and a radiation-curable monomer or oligomer, is under-coated on a metal plate and heat-cured, and then a radiation curable paint is overcoated, followed by radiation curing (Japanese Unexamined Patent Publication No. 125879/1987). However, the coating films thereby obtained had a drawback that the hardness was inadequate while the flexibility was adequate, or inversely, the flexibility was inadequate while the hardness was very high (e.g. Japanese Examined Patent Publication No. 8070/1981). Thus, there has been no coating film which satisfies both properties of high flexibility and high hardness.

A coating composition for which ultraviolet curing and heat curing are used in combination, is also known (e.g. Japanese Unexamined Patent Publications No. 112865/1985 and No. 103216/1990). However, the hardness of the coating film thereby obtained was inadequate.

SUMMARY OF THE INVENTION

The present invention has been made to solve such various problems of the prior art. It is an object of the present invention to provide a coating composition which is capable of forming a coating film having high flexibility as well as high hardness and a high level of stain resistance. Further, it is another object of the present invention to provide a process for producing a precoated plate having such a coating composition coated thereon.

Thus, the present invention provides a coating composition having photopolymerizability and heat curability, which comprises, as main components, (A) a vinyl copolymer having polymerizable double bonds and crosslinkable hydroxyl groups, (B) a condensation polymerizable compound of the following formula (i) or a condensation polymer thereof, and (C) a photopolymerization initiator:

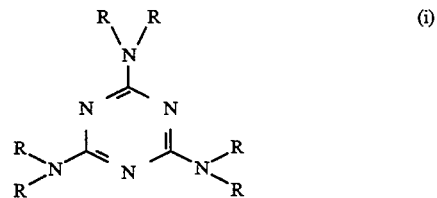

(i)

wherein each of the plurality of R which may be the same or different, is —H, —CH$_2$OH, —CH$_2$OCH$_3$, —CH$_2$OC$_4$H$_9$,

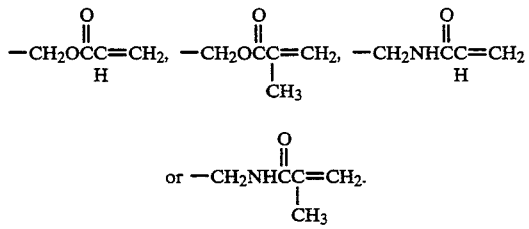

The present invention also provides a process for producing a precoated plate comprising:

(I) a step of coating such a coating composition on a metal plate, laminating a transparent protective film on the coated surface, as the case requires, and then irradiating ultraviolet rays to form a primarily cured coating film, (II) a step of subjecting the coated metal plate to deformation shaping, and (III) a step of removing the protective film and baking the shaped coated metal plate to completely cure the primarily cured coating film.

The present invention further provides a process for producing a precoated plate comprising:

(I) a step of coating such a coating composition on a metal plate, and then irradiating ultraviolet rays to form a primarily cured coating film, (II) a step of laminating a protective film on the primarily cured coating film surface, and then subjecting the coated metal plate to deformation shaping, and (III) a step of removing the protective film and baking the shaped coated metal plate to completely cure the primarily cured coating film.

DETAILED DESCRIPTION OF PREFERRED EMBODIMENTS

The first component (A) of the coating composition of the present invention is a vinyl copolymer having polymerizable double bonds and crosslinkable hydroxyl groups.

In combination with a condensation polymerizable compound or a condensation polymer thereof of component (B) which will be described hereinafter, the component (A) brings about such effects that when coated and radiation-cured by ultraviolet irradiation, the composition presents a primarily cured coating film which has a sufficient elongation and a proper elasticity for recovery during the deformation shaping process of the precoated metal, and it presents high hardness and excellent stain resistance to the final coating film after baking.

The vinyl copolymer used as component (A) in the present invention is, particularly preferably, a copolymer comprising, in the main chain of the vinyl polymer, (a) at least 70 mol % of methyl methacrylate units, (b) from 5 to 25 mol % of units of the following formula (ii), formulas (ii) and (iii), formulas (ii) and (iv) or formulas (ii), (iii) and (iv), provided that units of the formula (ii) are at least 5 mol %, and (c) other monomer units,

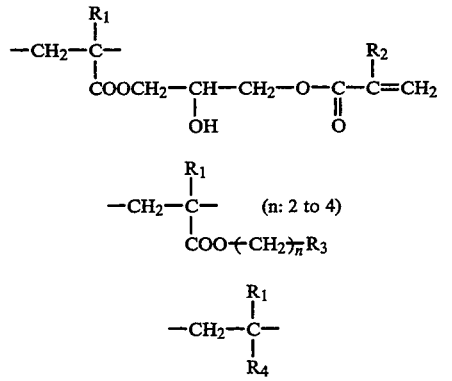

wherein each of $R_1$ and $R_2$ is H or $CH_3$; $R_3$ is

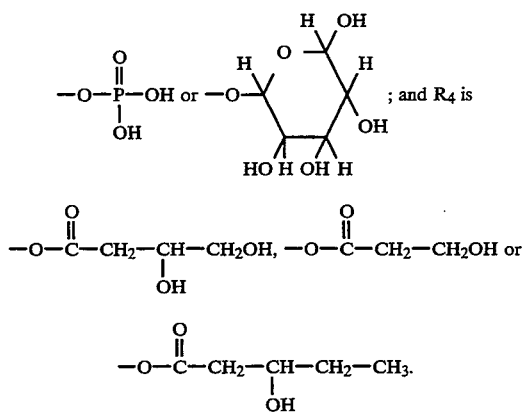

; and $R_4$ is

Said other monomers as a copolymer component of the vinyl copolymer include, for example, polymerizable monomers containing an $\alpha,\beta$-monoethylenically unsaturated bond, such as methyl acrylate, ethyl methacrylate, ethyl acrylate, isopropyl acrylate, n-butyl methacrylate, n-butyl acrylate, isobutyl acrylate, n-hexyl acrylate, n-octyl acrylate, n-octyl methacrylate, n-decyl methacrylate, cyclohexyl methacrylate, hydroxyethyl methacrylate, hydroxyethyl acrylate, hydroxypropyl acrylate, hydroxypropyl methacrylate, glycidyl methacrylate, glycidyl acrylate, acrylonitrile, styrene and vinyl chloride. Such polymerizable monomers may be used alone or in combination as a mixture of two or more of them. In the above composition, methyl methacrylate is preferably at least 70 mol % in view of the flexibility and hardness of the coating film, and the units of the formula (ii) are preferably at least 5 mol % in view of the flexibility of the coating film. Specific examples of the vinyl copolymer as the component (A) in the coating composition of the present invention include a polymer having partially esterified (meth)acrylic acid introduced to a copolymer comprising, as a component, hydroxyethyl (meth)acrylate, hydroxypropyl (meth)acrylate or glucoxy (meth)acrylate; a polymer having esterified (meth)acrylic acid, crotonic acid or cinnamic acid introduced to a copolymer comprising glycidyl (meth)acrylate as a component; and a polymer having glycidyl (meth)acrylate introduced by addition to a carboxyl group-containing polymer. These copolymers may be used alone or in combination as a mixture of two or more of them. Among the above copolymers, a polymer having (meth)acryloyl groups as side chains or as parts of the side chains, is particularly preferred. For the vinyl copolymer to perform the intended effects in combination with the component (B) of the present invention, the weight average molecular weight is preferably at least 10,000 and most preferably within a range of from 30,000 to 300,000 from the viewpoint of the coating properties, adhesiveness of the coating film surface and chemical resistance.

The component (B) used for the coating composition of the present invention is a compound having a triazine ring structure represented by the above formula (i) or a condensation polymer thereof. As the compound of the component (B), a compound containing at least one methylol group, alkoxymethyl group (C=1 to 5) or (meth)acryloyl group, is preferred. (However, in the case of the (meth)acryloyl group, no more than two such groups may better be contained, since the flexibility tends to be poor.) For example, methyl etherified melamine, butyl methyl mixed etherified melamine, partially acryloyl-modified methoxymethylol melamine and partially urethane acrylate-modified methylol melamine may be mentioned. Condensation polymers of such compounds preferably-have a molecular weight of at most about 6,000.

Commercial products include, for example, UVAN 20SE (tradename, manufactured by Mitsui Toatsu Chemicals, Inc.) as a butyl etherified melamine resin, CYMEL (tradename, manufactured by Mitsui-Cyanamid, Ltd.) as a methyl etherified or mixed etherified melamine resin, and NK-OLIGO (tradename, manufactured by Shin-Nakamura Chemical Co., Ltd.) as a partially acryloyl-modified methoxymethylol melamine resin.

As the photopolymerization initiator of component (C) to be used for the coating composition of the present invention, those commonly commercially available can be used without any problem. Specifically, there may be mentioned, for example, benzoin, benzoin alkyl ethers, anthraquinone derivatives, benzanthrone derivatives, 2,2-dimethoxy-2-phenylacetophenone, 1-hydroxycyclohexylphenylketone, 2-methyl-[4-(methylthio)-phenyl]-2-morpholino-1-propane, benzyl derivatives, benzophenone derivatives, xanthone derivatives, thioxanthone derivatives, bisimidazoles, acylphosphines, 4,4'-bis-dimethylaminobenzophenone, trichloromethyl-8-triazine, 3,4,3',4'-tetra(t-butylperoxycarbonyl)benzophenone and combinations of these initiators with amine compounds. Such initiators may be used alone or in combination as a mixture of two or more of them. In the coating composition of the present invention, the component (B) is used preferably in an amount of from 30 to 150 parts by weight per 100 parts by weight of the component (A). If the component (B) is less than 30 parts by weight, the hardness of the coating film tends to be low. On the other hand, if it exceeds 150 parts by weight, the coating film after processing tends to be tacky, and the plastic deformation of the coating film tends to be large, and the recovery of the creep deformation during the storage tends to be difficult.

The component (C) is used preferably within a range of from 0.05 to 10 parts by weight, more preferably from 0.3 to 6 parts by weight, per 100 parts by weight of the component (A). Further, for the purpose of forming a coating film having better flexibility, elasticity, hardness and impact strength, at least one component selected from the group consisting of a monomer having at least one polymerizable double bond and crosslinkable hydroxyl group and a urethane (meth)acrylate oligomer, may be incorporated as component (D) in the coating composition of the present invention. Such a monomer may, for example, be glycidyl (meth)acrylate, glycerol (meth)acrylate, glucoxy (meth)acrylate, 2-hydroxyethyl (meth)acrylate, 2-hydroxypropyl (meth)acrylate, ethylene oxide-modified phosphoric acid (meth)acrylate, ethylene oxide, butanol-modified phosphoric acid (meth)acrylate.

The above monomer is used usually in an amount of at most 10 parts by weight, preferably at least 0.5 part by weight, per 100 parts by weight of the component (A). If the amount of the monomer exceeds 10 parts by weight, the storage stability of the coating composition or the flexibility of the coating film tends to be impaired. On the other hand, the incorporation of the urethane (meth)acrylate oligomer (inclusive of a resin) as the component (D) brings about an excellent effect for improving the impact resistance of the coating film. The oligomer preferably has a number average molecular weight within a range of from 500 to 100,000. If the number average molecular weight is too low, the effect for improving the impact resistance tends to be inadequate, and if it exceeds 100,000, the hardness of the coating film tends to decrease.

The urethane (meth)acrylate oligomer includes, for example, commercially available ARONIX (tradename, manufactured by Toa Gosei Chemical Industry Co., Ltd.) and NISS-PB (tradename, manufactured by Nippon Soda Co., Ltd.). The oligomer is used usually in an amount of at most 10 parts by weight, preferably at least 2 parts by weight, per 100 parts by weight of the component (A). If the amount is too small, the effect for improving the impact resistance tends to be low. On the other hand, if it exceeds 10 parts by weight, the hardness of the final coating film tends to be low, such being undesirable.

The coating composition of the present invention comprises the above described components as the main components and have a diluent incorporated to adjust the viscosity to a level of from about 20 to about 150 seconds (Ford cup No. 4). The diluent may be a non-reactive diluent which is commonly used, such as toluene, xylene, ethyl acetate, butyl acetate, methyl cellusolve, ethyl cellusolve, methyl ethyl ketone, methyl isobutyl ketone, cyclohexanone, or diethylene glycol monoethyl ether acetate. Further, a reactive diluent such as 2-ethylhexyl (meth)acrylate, vinyl acetate, vinyltoluene, N-vinylbenzene or dimethyl (meth)acrylamide may also be used.

The coating composition of the present invention may contain, in addition to the above components, various pigments or fillers for the purpose of coloring or hiding, a surfactant, a dispersant, a plasticizer, a polymerization inhibitor and a cross-linking catalyst, to an extent not to impair the purpose of the present invention. The coating composition of the present invention can readily be obtained by mixing the above components (A), (B), (C), a diluent and, if necessary, (D) and other components.

The coating composition of the present invention thus obtained may be coated on an object to be coated by such a method as spray coating, roller coating or curtain flow coating. To facilitate the coating operation, the coating composition may be heated or pressurized, as the case requires.

In the present invention, the object to be coated includes a wide range of objects, for example, metal plates such as a steel plate, an aluminum plate and a stainless steel plate, or inorganic plates. The present invention is effective particularly for precoated plates for which a high level of flexibility for processing is required. The object to be coated may be the one having a primer coating or an intercoating applied thereon. Particularly preferred is a process for producing a precoated plate comprising the following steps, in which the coating composition of the present invention is used. Namely, to a metal plate having surface treatment or primer coating applied as the case requires, the above-mentioned coating composition is coated as step (I). The composition is coated usually in such an amount that the dried film thickness would be from about 10 to 200 $\mu$m. When a non-reactive diluent is incorporated in the coating composition, the coated plate is heated at a temperature lower than the temperature for the initiation of the heat cross-linking reaction, e.g. at a low temperature of from about 50° to 120° C., to evaporate the non-reactive diluent in the non-cured coating film, prior to the irradiation of the ultraviolet rays. Then, ultraviolet rays are irradiated so that the coating film is radiation-cured to form a primarily cured coating film. At this stage, hydroxyl groups in the component (A) (and component (D)) do not substantially react with the component (B). For irradiating the ultraviolet rays, a usual lamp commonly used for curing a ultraviolet-curable paint, such as a high pressure mercury lamp or a metal halide lamp, can be used without any particular restriction, and the dose is usually from about 200 to 2,000 mj/cm$^2$.

For the purpose of preventing interference of oxygen to the curing of the coating film, it is preferred to laminate a transparent protective film on the coating film surface prior to irradiation of the ultraviolet rays.

After forming the primarily cured coating film on the metal surface, the coated metal plate is shaped by bending or cutting to obtain a coated metal plate of a desired shape, as step (II). When the protective film was laminated, it is removed prior to or after the shaping of the coated metal plate.

If such a film was not laminated, a protective film may be laminated on the coated plate having the primarily cured coating layer, to protect the coating film during the shaping of the coated metal plate, and such a film may be removed after shaping.

The coated metal plate having a primarily cured coating film may not immediately be processed to the step (II) and may be stored for a certain period and then may be subjected to shaping of the coated metal plate in the step (II).

After shaping the coated metal plate, the coated metal plate is baked in Step (III) to permit the cross-linking reaction of the hydroxyl groups in the component (A) (and the component (D)) with the component (B), so that the primarily cured coating film is completely cured. This baking can be accomplished by heating the shaped coated metal plate at a temperature of from about 30° to 300° C. for about one to 30 minutes.

In the present invention, the component (A) (and the component (D)) in the composition contributes to the improvement of the adhesion to the object to be coated and the flexibility of the coating film, and the component (B) reacts to the component (B) itself and/or with active hydrogen groups in the component (A) (and the component (D)) under heating to form numerous cross-linking points, the resulting stiff structure contributes to the hardness of the coating film. Further, the polymerizable double bonds in the component (B) will form elastic cross-linking points by the curing reaction with ultraviolet rays, whereby various creeping phenomena occurring in the coating film prior to curing by heating can be elastically reduced.

The coating composition of the present invention is provided with both the properties required for the coating and shaping steps (i.e. up to the step (II)) (such as coating efficiency, deformation shaping properties, creep properties) and high levels of properties required for the final coating film after the above step (III) (such as hardness, heat resistance, stain resistance, weather resistance, adhesive properties, chemical resistance), whereby finally a coating film with a pencil hardness of at least 5H (JIS K-5400, 8.4.2) and a flexibility of OT (JIS G-3312, 12.2 inside distance of bending: 0 sheet of the prescribed thickness) can be obtained. Accordingly, it is industrially highly useful as a coating composition for precoated metals to be deformed to a large extent for shaping.

Now, the present invention will be described in further detail with reference to Examples. However, it should be understood that the present invention is by no means restricted to such specific Examples.

Preparation of component (A)

PREPARATION EXAMPLE 1

Into a four necked flask, 103.7 parts by weight of butyl acetate was charged and heated to 92° C. under a nitrogen stream. Then, a mixture having 0.3 part by weight of tert-butyl peroxy-2-ethylhexanoate preliminarily dissolved in 128.5 parts by weight of methyl methacrylate, 15.5 parts by weight of ethyl acrylate, 9 parts by weight acrylic acid and 125 parts by weight of butyl acetate, was dropwise added thereto over a period of 3 hours. Then, the temperature was raised to 98° C. over a period of one hour. Then, a mixture having 0.3 part by weight of tert-butyl peroxy-2-ethylhexanoate dissolved in 90 parts by weight of butyl acetate, was further dropwise added thereto over a period of 2 hours, and the mixture was further aged for 2 hours. Then, 0.25 part by weight of hydroquinone and 0.1 part by weight of triethylamine were added thereto, and the mixture was heated to 130° C. Then, 17.7 parts by weight of glycidyl methacrylate was added, and the mixture was reacted for 2 hours. A polymer thereby obtained had a solid content of 35% by weight and a weight average molecular weight of $17 \times 10^4$.(Component A-1)

PREPARATION EXAMPLE 2

The reaction was conducted in the same manner as in Preparation Example 1 except that the dropwise added monomers in Preparation Example 1 were changed to 128.5 parts by weight of methyl methacrylate, 12.4 parts by weight of ethyl acrylate, 9 parts by weight of acrylic acid and 3.1 parts by weight of glycoxyethyl methacrylate. A polymer thereby obtained had a solid content of 35% by weight and a weight average molecular weight of $16 \times 10^4$. (Component A-2) EXAMPLES 1 TO 5 AND COMPARATIVE EXAMPLES 1 TO 3

The components as identified in Table 1 were mixed to obtain coating compositions of the present invention and comparative compositions. Then, each composition was adjusted with ethyl acetate to a viscosity of 70 seconds (Ford cut No. 4/20° C.) and then coated on a stainless steel substrate by means of a curtain flow coater so that the dried film thickness would be 30 μm, followed by drying at 80° C. for 5 minutes to evaporate the diluent. Then, a polyethylene film having a thickness of 50 μm was covered as a protective film, and exposure was conducted from a distance of 10 cm by means of a high pressure mercury lamp with the light intensity of 120 W/cm at a substrate speed of 5 m/min to obtain a primarily cured coating film. The substrate thus obtained was subjected to 180° T-bending flexibility test and blocking creep test. Evaluation of cracking and peeling of the bent portion and evaluation of blocking-creep test were conducted after curing by heating and drying.

From the substrate subjected to bending, the protective film was removed, followed by heat curing at 180° C. for 30 minutes to obtain a final coating film. The final coating film was tested for hardness, stain resistance and impact resistance. The results thereby obtained are shown in Table 2.

TABLE 1

| | Formulation (parts by weight of solid contents) | | | | | |
|---|---|---|---|---|---|---|
| | Component (A) | | Component (B) | | | Other |
| | A-1 | A-2 | B-1[(2)] | B-2[(3)] | Component (C)[(4)] | components |
| Example 1 | 30 parts | | 30 parts | | 1.4 parts | |
| Example 2 | 30 parts | | | 30 parts | 1.4 parts | |
| Example 3 | 30 parts | | 30 parts | | 1.4 parts | 5 parts[(5)] |
| Example 4 | | 30 parts | 30 parts | | 1.4 parts | |
| Example 5 | | 30 parts | | 30 parts | 1.4 parts | 2 parts[(6)] |
| Comparative Example 1 | 30 parts | | | | 1.4 parts | 30 parts[(7)] |
| Comparative Example 2 | 30 parts | | 30 parts | | 0 | |

TABLE 1 -continued

| | Formulation (parts by weight of solid contents) | | | | | |
|---|---|---|---|---|---|---|
| | Component (A) | | Component (B) | | | Other |
| | A-1 | A-2 | B-1[(2)] | B-2[(3)] | Component (C)[(4)] | components |
| Comparative Example 3 | 30 parts[(1)] | | 30 parts | | 0 | |

[(1)]Polyester polyol: VYLON TP005 (tradename, manufactured by Toyobo Co., Ltd.), weight average molecular weight: $10 \times 10^4$
[(2)]Melamine resin: CYMEL 325 (tradename, manufactured by Mitsui-Cyanamid. Ltd.)
[(3)]Melamine acrylate resin: NK-OLIGO (tradename, manufactured by Shin-Nakamura Chemical Co., Ltd.)
[(4)]As a photopolymerization initiator, a mixture comprising 1 part by weight of benzophenone and 0.4 part by weight of Michler's ketone, was used.
[(5)]Silica pigment
[(6)]Urethane acrylate oligomer resin: ARONIX M1100 (tradename, manufactured by Toa Gosei Chemical Industry Co., Ltd.)
(7)

$$CH_2=CHCOOCH_2-\underset{\underset{CH_2OCOCH=CH_2}{|}}{\overset{\overset{CH_2OCOCH=CH_2}{|}}{C}}-CH_2OCOCH=CH_2$$

TABLE 2

| | Test results | | | | |
|---|---|---|---|---|---|
| | Blocking-creep recovery (1) | Bending flexibility (2) | Pencil hardness (3) | Impact resistance (4) | Stain resistance (5) |
| Example 1 | ○ | Pass | 5H | ○ | ○ |
| Example 2 | ⊙ | Pass | 5H–6H | ○ | ○ |
| Example 3 | ⊙ | Pass | 5H–6H | ○ | ○ |
| Example 4 | ○ | Pass | 5H | ○ | ○ |
| Example 5 | ⊙ | Pass | 5H | ⊙ | ○ |
| Comparative Example 1 | ○ | Fail | 4H | X | ○ |
| Comparative Example 2 | X | Fail | 5H | ○ | ○ |
| Comparative Example 3 | X | Fail | 3H | X | Δ |

(1) Blocking-creep recovery:
While a deformation in a longitudinal direction of 20, 30 and 50% of the film thickness was imparted to the coating film after curing with ultraviolet rays, a pressure of 40 kg/cm² was exerted at 40° C. for 8 hours, and the recovery of the formed deformation was evaluated after the final curing.
⊙: A deformation of 50% disappears
○: A deformation of 30% disappears
Δ: A deformation of 20% disappears
X: A deformation of 20% remains
(2) Bending flexibility:
By a bending vice stipulated in JIS K-5400, 8.1 (Flexing resistance), the substrate was preliminarily bent into a U-shape and then crushed by a vice, whereupon the state of the coating film at the bent R portion was inspected by a magnifying glass of 30 × magnification, whereby the one with no cracking of the coating film was evaluated to be "Pass", and the one with cracking or the like was evaluated to be "Fail".
(3) Pencil hardness
Using a MITSUBISHI UNI PENCIL, the test was conducted in accordance with JIS K-5400, 8.4.2.
(4) Impact resistance:
Using a Du Pont impact tester prescribed in JIS K-5400, 8.3.2, a weight of 300 g was dropped on the coating film placed on a semi-spherical die with a radius of 6.35 mm.
⊙: No abnormality was observed with the impact from a height of at least 20 cm.
○: No cracking was observed with the impact from a height of 10 cm.
X: Cracking or the like was observed with the impact from a height of less than 10 cm.
(5) Stain resistance:
A mark was drawn on the coating film surface with a marker ink (manufactured by Uchida Yoko Co., Ltd.) at 20° C. and left to stand for 24 hours, whereupon the mark was wiped off with a gauze impregnated with ethanol, and the trace of the mark was evaluated.
○: No trace remained
Δ: The trace of the mark slightly remained.
X: The trace of the mark substantially remained.

We claim:
1. A process for producing a precoated plate, comprising:
(I-i) coating a metal plate with a coating composition comprising:
(A) a vinyl copolymer having polymerizable double bonds and crosslinkable hydroxyl groups,
(B) a condensation polymerizable compound of Formula (i) or a condensation polymer thereof:

$$\begin{array}{c} R\diagdown\phantom{N}\diagup R \\ N \\ | \\ N{=}\!\diagup\phantom{XX}\diagdown\!{=}\!N \\ R\diagdown\phantom{N}\diagup\phantom{XX}\diagdown\phantom{N}\diagup R \\ N\phantom{XXXX}N \\ | \phantom{XXXXX} \| \\ R\phantom{XXXX}R \end{array} \qquad (i)$$

wherein each of the plurality of R groups, which may be the same or different, is —H, —CH$_2$OH, —CH$_2$OCH$_3$, —CH$_2$OC$_4$H$_9$, $$-CH_2O\underset{H}{\overset{\overset{O}{\|}}{C}}C=CH_2, \quad -CH_2O\underset{CH_3}{\overset{\overset{O}{\|}}{C}}C=CH_2, \quad -CH_2NH\underset{H}{\overset{\overset{O}{\|}}{C}}C=CH_2$$

or $-CH_2NH\underset{CH_3}{\overset{\overset{O}{\|}}{C}}C=CH_2$; and (C) a photopolymerization initiator;
(ii) laminating a transparent protective film onto the coated surface; and then
(iii) irradiating the coated surface with ultraviolet radiation to form an initially cured coated film;
(II) subjecting the coated metal plate to deformation shaping; and (III) removing the protective film and baking the shaped coated metal plate to completely cure the initially cured coating film.

2. The process of claim 1, wherein said coating composition further comprises a component (D) which is at least one component selected from the group consisting of a monomer having at least one polymerizable double bond and crosslinkable hydroxyl group, and a urethane (meth) acrylate oligomer.

3. The process of claim 1, wherein the vinyl copolymer is a copolymer having a weight average molecular weight of at least 10,000 and comprising, in the main chain of the vinyl polymer, (A) at least 70 mol % of methyl methacrylate units,
(B) from 5 to 25 mol % of units of the following formula (ii), formulas (ii) and (iii), formulas (ii) and (iv) or formulas (ii), (iii) and (iv), provided that units of the formula (ii) are at least 5 mol %, and
(C) other monomer units,

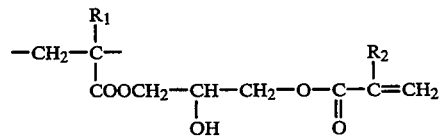
(ii)

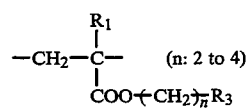
(iii)

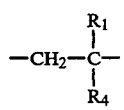
(iv)

wherein each of $R_1$ and $R_2$ is H or $CH_3$; $R_3$ is

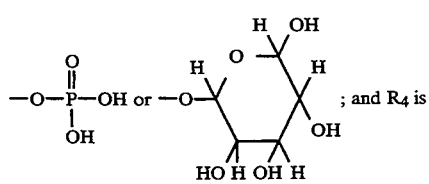
; and $R_4$ is

-continued
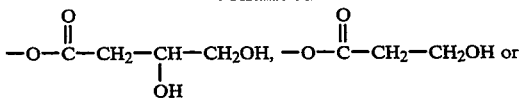

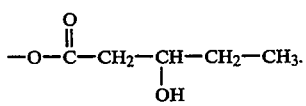

4. A process for producing a precoated plate, comprising;
(I-i) coating a metal plate with a coating composition comprising:
(A) a vinyl copolymer having polymerizable double bonds and crosslinkable hydroxyl groups,
(B) a condensation polymerizable compound of formula
(i) or a condensation polymer thereof:

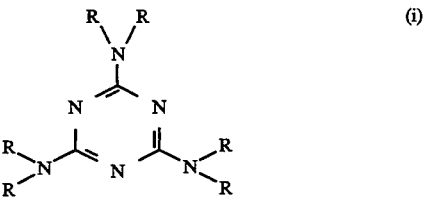
(i)

wherein each of the plurality of R groups, which may be the same or different, is —H, —$CH_2OH$, —$CH_2OCH_3$, —$CH_2OC_4H_9$,

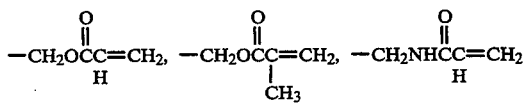

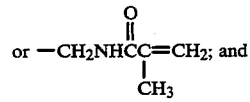

(C) a photopolymerization initiator;
(ii) irradiating the coated surface with ultraviolet radiation to forth an initially cured coated film;
(II) laminating the surface of the initially cured film with a protective film
(III) subjecting the coated metal plate to deformation shaping; and
(IV) removing the protective film and baking the shaped coated metal plate to completely cure the initially cured coating film.

* * * * *